Nov. 17, 1942.　　　M. CORNELL ET AL　　　2,302,529
REPEATING VALVE SHUT-OFF SYSTEM
Filed March 7, 1939　　　8 Sheets—Sheet 2

INVENTOR
MEAD CORNELL AND
ALEXANDER R. WHITTAKER
BY
James & Franklin
ATTORNEY

Nov. 17, 1942.    M. CORNELL ET AL    2,302,529
REPEATING VALVE SHUT-OFF SYSTEM
Filed March 7, 1939    8 Sheets-Sheet 3

INVENTOR
MEAD CORNELL AND
ALEXANDER R. WHITTAKER
BY
James & Franklin
ATTORNEY Nov. 17, 1942.   M. CORNELL ET AL   2,302,529
REPEATING VALVE SHUT-OFF SYSTEM
Filed March 7, 1939   8 Sheets-Sheet 4

INVENTOR
MEAD CORNELL AND
ALEXANDER R. WHITTAKER
BY
*James & Franklin*
ATTORNEY

Nov. 17, 1942.　　M. CORNELL ET AL　　2,302,529
REPEATING VALVE SHUT-OFF SYSTEM
Filed March 7, 1939　　8 Sheets-Sheet 6

INVENTOR
MEAD CORNELL AND
ALEXANDER R. WHITTAKER
BY
ATTORNEY

Nov. 17, 1942.　　　M. CORNELL ET AL　　　2,302,529
REPEATING VALVE SHUT-OFF SYSTEM
Filed March 7, 1939　　　8 Sheets-Sheet 7

INVENTOR
MEAD CORNELL AND
ALEXANDER R. WHITTAKER
BY
ATTORNEY

Nov. 17, 1942.  M. CORNELL ET AL  2,302,529
REPEATING VALVE SHUT-OFF SYSTEM
Filed March 7, 1939  8 Sheets-Sheet 8

INVENTOR
MEAD CORNELL AND
ALEXANDER R. WHITTAKER
BY
ATTORNEY

Patented Nov. 17, 1942

2,302,529

UNITED STATES PATENT OFFICE 2,302,529

REPEATING VALVE SHUTOFF SYSTEM

Mead Cornell, Cleveland, Ohio, and Alexander R. Whittaker, New York, N. Y., assignors, by mesne assignments, to Pittsburgh Equitable Meter Company, Pittsburgh, Pa., a corporation of Pennsylvania Application March 7, 1939, Serial No. 260,270

21 Claims. (Cl. 221—101)

This invention relates to a repeating valve shut-off system, especially for rapid measured filling of large containers, for example barrels.

The filling of barrels, for example, the filling of metal barrels with lubricating oil, is difficult. At the present time, it is the practice to specify the content of the barrel in terms of gallons at a standard temperature, say, 60° F. For this purpose, it is the present practice to actually weigh the contents of the barrel. The barrels are filled through a nozzle having a nozzle float or like trip mechanism to shut off the flow of oil when the barrel is filled. The barrel is weighed before and after filling, and the weight of the contained oil is converted into gallons by reference to suitable conversion tables. The content in gallons is then painted on the side of the barrel. This must be done each time the barrel is filled, for the quantity held by even one particular barrel may vary from time to time as the barrel is knocked around in service and becomes indented at many points. The barrel filling operation is slow, first because the flow through the nozzle is merely gravitational, in order to permit the desired float shut-off action, and second because of the time needed to weigh and mark the individual barrels.

The primary object of the present invention is to overcome the foregoing difficulties and to provide a valve shut-off system which will permit the barrels to be filled rapidly under pump pressure. For this purpose, the flow of oil is measured by a meter, and temperature compensating mechanism is provided responsive to the temperature of the fluid flowing through the meter, so that the measurement will be in gallons at a predetermined standard temperature, say, 60° F. If the particular size of barrel being filled varies from, say, 53 to 54 gallons, due to indentations, etc., a fixed content of 53 gallons, that is, the lower limit, is adopted. Appropriate valve shut-off mechanism stops the delivery of oil at exactly the desired value, say, 53 gallons, whereupon the apparatus is ready to immediately fill another barrel.

A further object of the present invention is to provide automatic resetting of the trip mechanism and quick starting of the valve, it being necessary to merely move a single handle for each barrel filling operation. Still another object is to facilitate changing the gearing of the trip mechanism so as to change the trip quantity, as, for example, from 50 gallons for one series or size of barrel, to, say, 55 gallons for another series or size of barrel. For this purpose, certain gears are made readily movable and replaceable. Various gears are provided for different trip quantities, and to avoid possibility of error or confusion, the gears are preferably inseparably mounted on a large and conspicuously marked gear plate.

Still another object is to employ a positive drive in the temperature compensating mechanism, thereby avoiding the inaccuracy of friction drives which have proved to be notoriously unsatisfactory in practice. A further and ancillary object is to provide means for adjusting the amount or rate of temperature compensation, thus making it possible to accommodate differences in the response of different supposedly uniformly manufactured expansion bellows, or differences in the amount of expansion to be corrected when working with different fluids.

Another object of the invention is to obtain accurate shut-off, together with high-speed filling. The valve mechanism is preferably hydraulically operated, and even the pilot valve may be moved by a spring which is initially tensioned by the starting handle, so that the valve tripping load on the meter is slight, even though the trip mechanism and valve mechanism are made sturdy and rugged for absolute dependability and long life.

Still another object is to provide a manually operable reset means and indicator means for resetting the trip mechanism to zero when desired, this being of value if for some reason the flow is interrupted before finishing a barrel.

To the accomplishment of the foregoing and such other objects as will hereinafter appear, our invention consists in the fluid measuring and temperature compensating and valve tripping elements, and their relation one to the other, as hereinafter are more particularly described in the specification and sought to be defined in the claims. The specification is accompanied by drawings, in which:

Figures 1, 2:
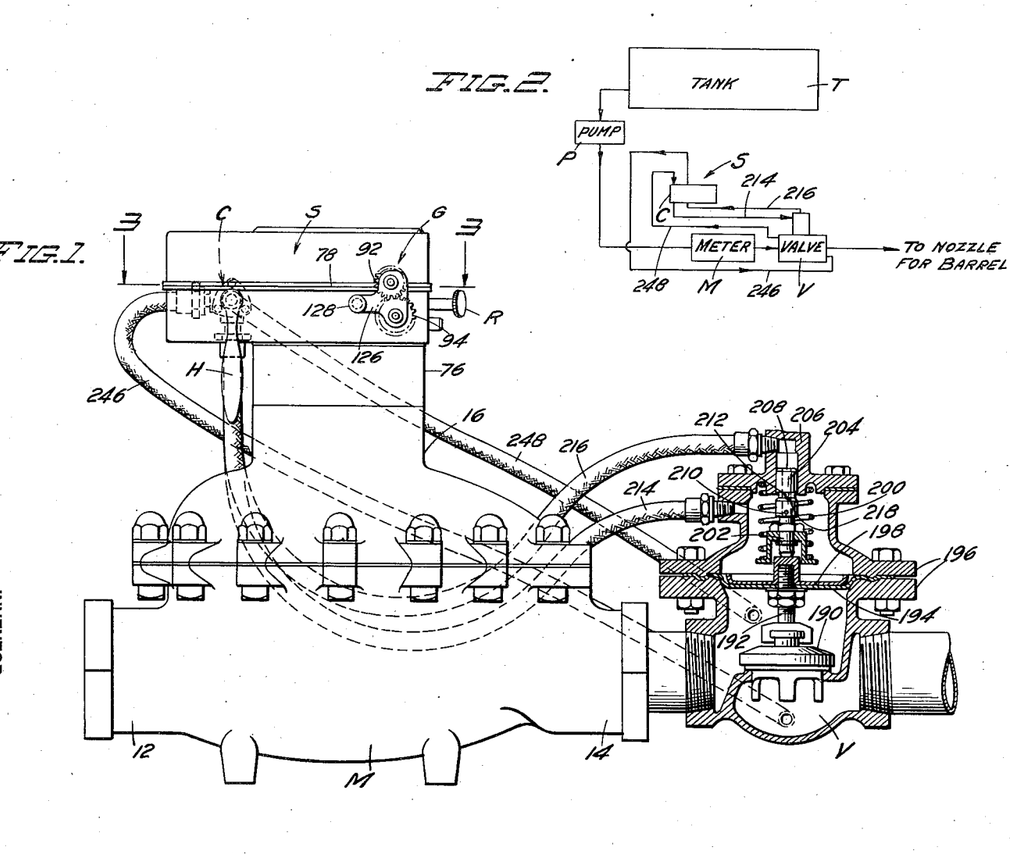
Fig. 1 is a partially sectioned side elevation of an apparatus embodying features of the present invention.
Fig. 2 is a schematic flow diagram for the same.

Referring to the drawing, and more particularly to Figs. 1 and 2, the apparatus as here exemplified comprises a meter M which may be of conventional type, an hydraulically operated valve V, and valve shut-off mechanism generally designated S. The valve shut-off mechanism includes a pilot valve or control valve C which is connected by suitable piping to control the main valve V. The control valve is initially cocked from valve closing to valve opening position by means of an operating handle H. The barrel is then rapidly filled with fluid delivered from any suitable tank T under the pressure of a pump P. When the predetermined desired quantity is approached within, say, one gallon, the valve tripping mechanism releases the control valve for movement to an intermediate position causing partial closing of the main valve V. The rate of flow through the meter is thus slowed down, and when the exact delivery quantity is reached, the control valve is moved further and produces complete shut-off at the main valve. The measurement is compensated for temperature variation by means of temperature compensating mechanism subsequently described, and best shown in Figs. 19 and 20 of the drawings, this mechanism being disposed at the neck of the meter, between the meter and the valve tripping mechanism S.

When another barrel is to be filled, it is merely necessary to again swing the handle H. It is not necessary to preset a register for the desired trip quantity, and in fact no register is needed or provided. The quantity at which the trip action takes place is determined with the aid of replaceable gears indicated at G, and may be still more accurately regulated by means of an accuracy regulator adjusted by means of knob R.

Considering the apparatus in greater detail, the meter M may be of standard type, it having an inlet 12, an outlet 14, and a neck 16 through which the meter drive passes. Temperature compensation is provided, and, for reasons heretofore explained, is extremely valuable for the specific purpose of filling barrels or other containers in which the quantity is to be rated at a standard temperature. The particular temperature compensating mechanism which we prefer to employ is of the type disclosed in co-pending application Serial No. 232,978, entitled "Temperature compensated fluid measuring system," filed October 3, 1938, by Alexander R. Whittaker, one of the inventors herein. The said mechanism has the advantage of providing a positive drive and a high degree of accuracy, together with minimum frictional load on the meter.

Figure 19:
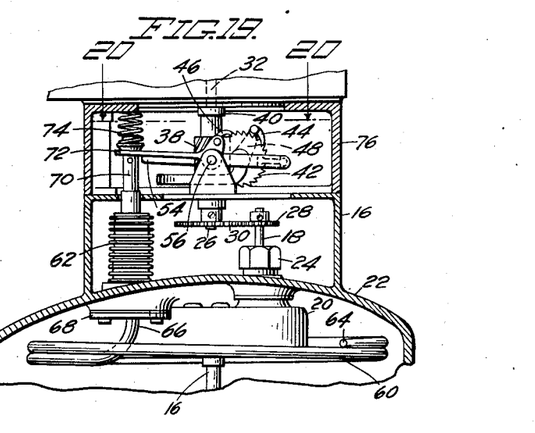
Fig. 19 is a section taken in elevation through the upper or neck portion of the meter and shows the temperature compensating mechanism.
Figure 20:
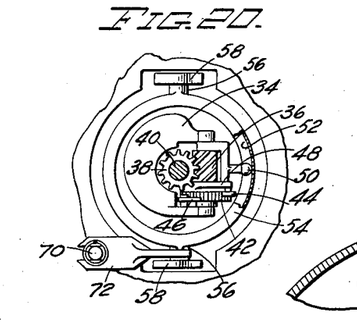
Fig. 20 is a plan view further explanatory of the temperature compensating mechanism and taken approximately in the plane of the line 20—20 of Fig. 19.

Referring now to Figs. 19 and 20, the meter piston rotates shaft 16, which, through an appropriate train of gearing or so-called intermediate carried in housing 20, drives a shaft 18. The liquid filling meter body 22 is confined by packing mechanism 24. Shaft 18 drives a shaft 26 through gears 28 and 30. Coaxial with shaft 26 is a driven shaft 32.

The shafts 26 and 32 are coupled together by mechanism which rotates the shafts in unison and which, in addition, superposes a slight relative movement which causes a slight difference in the rotation of shaft 32 relative to shaft 26. Mechanism of this character is disclosed in United States Patent No. 2,079,197, granted to Charles P. Bergman on May 4, 1937, and entitled "Accuracy regulator." Briefly, the shaft 26 turns with it a frame 34 (Fig. 20) carrying a worm 36, meshing with a worm gear 38 having a collar 40 which receives driven shaft 32. When worm 36 does not rotate on its own axis, the shafts 26 and 32 turn in unison as worm 36 revolves about the axis of the shafts. Worm 36 is secured to a ratchet wheel 42 engaged by an operating pawl 44 and a holding pawl 46. Operating pawl 44 is carried by an arm 48 which has an extension 50 with a rounded or ball-like end received within a groove 52 formed at the inside of a ring 54. This ring concentrically surrounds shafts 26 and 32 and is mounted on horizontal diametrically opposed trunnions 56 carried in stationary bearings 58. With the ring 54 in horizontal position, the shafts rotate in unison, but if the ring is tilted somewhat, it causes an oscillation of the pawl arm 48 during each rotation of shaft 26, and this in turn causes a slight movement of the ratchet wheel and consequently of the worm, which in turn causes a slight movement of worm gear 38 so that driven shaft 32 is moved an amount slightly different from the driving shaft 26. This difference in rotation depends on the tilt or angle of ring 54.

The ring is tilted by a temperature responsive element. Specifically, the desired movement is obtained by expansion or contraction of a liquid carried in a tube or so-called bulb 60 (Fig. 19), said expansion being manifested in an expansion bellows 62. The tube 60 is coiled about the upper part of the meter body 22, and its free end 64 is sealed, while the opposite end 66 is connected through member 68 to the expansion bellows 62, the lower end of the bellows being fixedly mounted on member 68 while the upper end is movable and is connected to a vertically reciprocable post 70 which passes freely through the bifurcated end of an arm 72 (Fig. 20). The other end of arm 72 is connected to ring 54 at one of the trunnions. A restoring spring 74 may be provided so that the ring will be tilted in response to contraction as well as expansion of the bellows.

It will be understood that the gear relationship in the intermediate 20 and in gears 28 and 30 is such as to provide a desired rotation of driven shaft 32 at a specified standard temperature, say, 60° F. When the temperature of the liquid flowing through the meter body is less than 60° F., the rotation of driven shaft 32 is increased somewhat, while if the temperature is more than 60° F., the rotation of driven shaft 32 is decreased somewhat relative to the desired rotation at the theoretical standard temperature. The gearing of the temperature compensating mechanism is housed in an annular housing 76 which is received directly above the neck 16 of the meter, as is clearly shown in Fig. 1.

The valve tripping or shut-off mechanism S is mounted directly on top of annular housing 76. The casing of the shut-off mechanism is divided on a line 78, and the entire upper half of the casing may be removed, thus exposing the interior mechanism, as shown in Fig. 3.

Figure 3:
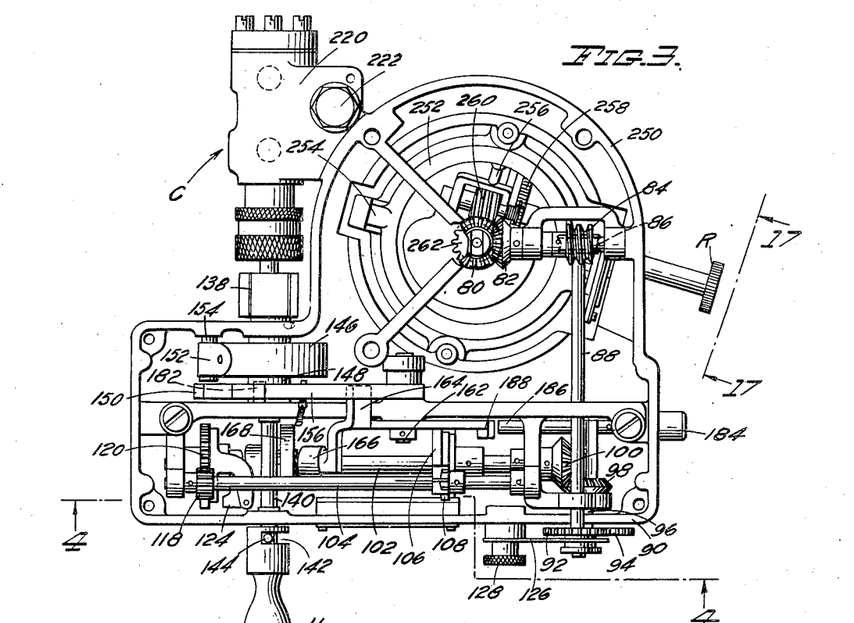
Fig. 3 shows the valve tripping mechanism in plan with the cover removed.
Figure 4:
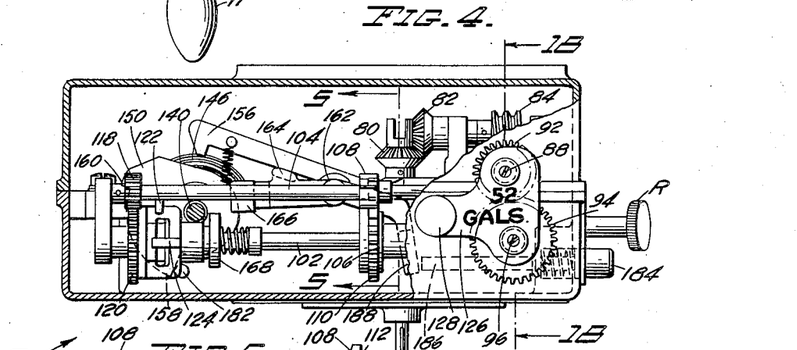
Fig. 4 is a section taken in elevation in the plane of the line 4—4 of Fig. 3.
Figure 5:
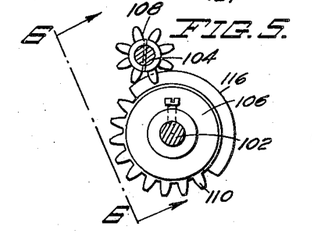
Fig. 5 is a section showing a Geneva type gearing between two shafts of the mechanism and is taken in the plane of the line 5—5 of Fig. 4.
Figure 6:
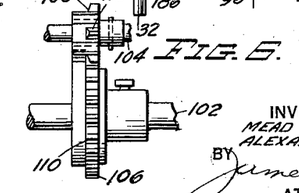
Fig. 6 shows the same in front elevation looking in the direction of the arrows 6—6 of Fig. 5.
Figure 8:
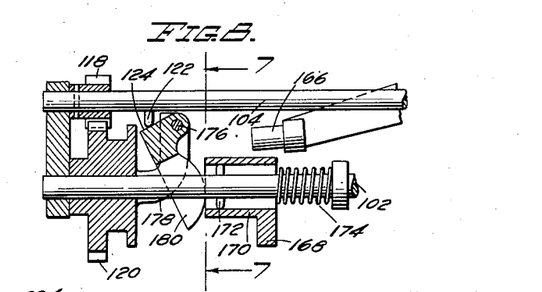
Fig. 8 is a section through the cam shifter in operative position, and is taken in the plane of the line 8—8 of Fig. 7.

Referring now to Figs. 3 and 4, the driven shaft 32 previously referred to leads into the accuracy regulating mechanism R, the output of which is applied to a mitre gear 80. Omitting the accuracy regulator R from consideration for the moment, mitre gear 80 drives mitre gear 82, which in turn rotates a worm 84 meshing with a worm gear 86 therebeneath. Worm gear 86 is mounted on the rear end of a forwardly extending shaft 88. The forward end of shaft 88 preferably projects through the front wall 90 of the casing, and carries an exposed gear 92. This meshes with a gear 94 mounted on the forward or outer end of a shaft 96. Shaft 96 carries a mitre gear 98 which meshes with a mitre gear 100 mounted at one end of a shaft 102, which may, for convenience, be called a cam shaft. A second shaft 104 is disposed parallel to cam shaft 102 and is geared to shaft 102 by Geneva type gearing including a driving element 106 on shaft 102 and a driven element 108 on shaft 104. These parts are best shown in Figs. 5 and 6 of the drawings, the driving element 106 comprising teeth 110 adapted to mesh with the eight teeth 112, four of which extend axially for locking engagement with the smooth large radius portion 116 of wheel 106. As will be understood by those skilled in the art, the wheel 108 resembles typical transfer pinions used for stepping successive digit wheels in a register. Wheel 106 resembles a typical stepping wheel, except that there are an increased number of teeth 110. The shaft 104 is intermittently moved in response to continuous rotation of cam shaft 102. Shaft 104 carries a pinion 118 meshing with a gear 120, said gear being freely rotatable on cam shaft 102. These rotate cooperative parts which come into contact when the meter reaches the predetermined desired trip quantity, and multiples thereof, but which miss one another and do not contact at any different quantity. Specifically, the pinion 118 turns a pin 122 projecting from shaft 104, while gear 120 turns cam shifter mechanism including a part 124 which, as will be clear from Fig. 8, is pushed inwardly by pin 122 when gears 118 and 120 come into proper relationship.

In the specific case here illustrated, the pinion 118 has eight teeth, and the gear 120 has twenty teeth. The cooperative parts therefore contact one another after two turns of the gear, or five turns of the pinion. By variation of the preceding gearing this is readily made to correspond to the predetermined desired delivery. Obviously, other ratios may be used for pinion 118 and gear 120, if desired.

Barrels range in size from 50 to 55 gallons. The mechanism so far described consists essentially of a gear train driven by the meter and having cooperative trip elements 122 and 124 on two different moving parts of the gear train, the gear relationship in the gear train being such that the said trip elements bear against one another when the meter reaches a predetermined desired trip quantity, and multiples thereof, but said elements miss one another at any different quantity. The trip quantity is adjustable by changing some of the gears in the gear train. Specifically, the pair of gears 92 and 94 is replaceable, one pair being used for a trip quantity of 50 gallons, another for a trip quantity of 51 gallons, and so on, up to, say 55 gallons in the specific mechanism here illustrated. A much greater range may be provided.

Figure 18:
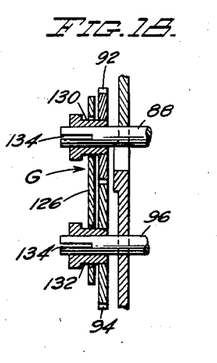
Fig. 18 is a section through the replaceable paired gears which determine the quantity at which the valve tripping mechanism operates, and is taken in the plane of the line 18—18 of Fig. 4.

It is important that there be no confusion as to the trip quantity produced by any particular pair of gears, and it is further important that the gears of the pairs be not mixed up with one another. With this in view, we mount each pair of gears on a plate or gear tag 126. This tag is detachably mounted on front wall 90 of the casing by means of a thumb screw 128. Referring now to Fig. 18, it may be explained that gear 92 is fixedly mounted on a hub 130, as by means of brazing, welding, or the like, and that gear 94 is similarly inseparably secured to a hub 132. Hubs 130 and 132 are passed through holes in gear tag 126 before fastening the hubs to the gears, and the gears are thereafter permanently associated with the gear tag. The gear tag is conspicuously marked with the number of gallons represented by the particular pair of gears in question. Thus, in Fig. 4, the gear tag is marked "52 gals."

The ends of shaft 88 and 96 are preferably split as shown at 134 in Fig. 18. The hubs 130 and 132 are provided with pins extending diametrically therethrough and adapted to be received in the slots 134. To change the trip quantity, it is merely necessary to remove the tag screw 128 and to then pry the gears off the shafts. The assembly of tag and gears is put aside, and another of desired value is applied to the shafts, following which the tag screw 128 is replaced.

Figure 9:
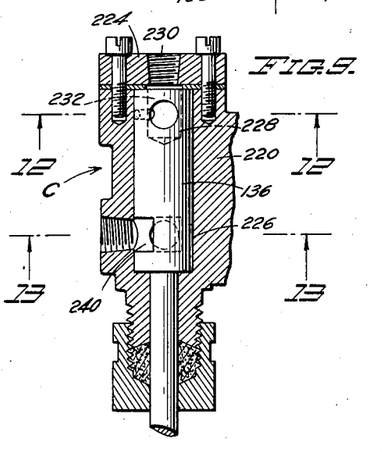
Fig. 9 is a longitudinal section through the pilot valve or control valve for controlling the hydraulically operated main valve.

The valve tripping impulse, obtained by engagement of pin 122 and the part 124 of the cam shifter, is applied only indirectly to the pilot or control valve C. Specifically, the rotor 136 (Fig. 9) of the control valve is coupled at 138 (Fig. 3) to a shaft 140 projecting forwardly through the casing of the trip mechanism. The starting handle H previously referred to is mounted on the forward end of shaft 140, preferably through a lost motion connection provided by slot 142 on the handle, and a pin 144 projecting from the shaft. This is so that the handle can fall back freely to its downward position immediately after starting the mechanism.

The shaft 140 is normally pulled in a counterclockwise direction by a spiral ribbon spring 146, the inner end of which is secured to the hub 148 of a notched arm or disk 150, and the outer end 152 of which is anchored on a pin 154 secured to the casing.

To open the main valve V, the handle H is turned in a clockwise direction against the resistance of spring 146. It is then held in position by a detent or hook 156 which catches on the tooth 158 of arm 150. Arm 150 is provided with a second notch or tooth 160 which reaches the detent 156 at a position of the rotor corresponding to partial closing of the main valve.

Hook 156 is pivotally mounted on a shaft 162 and is connected thereto by means of a sidewardly projecting finger 164 connected to a cam follower roller 166, disposed over cam shaft 102. Cam shaft 102 carries a cam 168 which is rotatable with but axially slidable on shaft 102. For this purpose, the hub 170 of cam 168 is splined or slidably keyed to shaft 102 by means of a pin 172, as is clearly shown in Fig. 8. Cam 168 is normally moved away from cam follower 166 by means of a compression spring 174, the parts then assuming the relation shown in Figs. 3 and 4.

Figure 7:
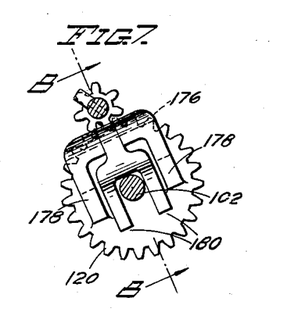
Fig. 7 is a section explanatory of a cam shifter forming a part of the trip mechanism, and is taken in the plane of the line 7—7 of Fig. 8.

The trip element 124 forms a part of a cam shifter which is pivotally mounted at 176 between spaced arms 178 (Figs. 7 and 8) secured to gear 120. The cam shifter is itself a forked member the branches 180 of which are on opposite sides of cam shaft 102. When the trip elements come into engagement, the shifter 180 is forced against the cam and moves the cam beneath the cam follower, as shown in Fig. 8.

Cam 168 is constantly rotating with cam shaft 102. The trip elements 122, 124 are adjusted to engage one another a little before the end of the run, and cam 168 slides beneath cam follower 166. The rise of the cam then bears against the cam follower and raises it progressively. At first, the detent 156 frees the arm 150, whereupon the arm oscillates abruptly under the influence of spiral spring 146 until the second tooth 160 engages detent 156, it being understood that tooth 160 is disposed at a radius greater than tooth 158. The continued rise of cam 168 further raises the cam follower 166, and with it the detent 156, until the second tooth 160 is also freed, this taking place when the exact trip quantity is reached. Spiral spring 146 instantly oscillates arm 150, and with it the rotor of the control valve to the shut-off position, as determined by a motion limiting stop 182.

The reason it is desirable to use an intermittent movement or Geneva type gearing between shafts 102 and 104 will now be clear because the action of the trip elements 122 and 124 may be made to precede the final tripping point, and cam 168 may be slid beneath the cam follower rather quickly. The cam is then kept in operative relation to the cam follower during its camming action.

In the event of emergency, the control valve may be tripped manually to the shut-off position by pushing a button 184 carrying a pusher rod 186 the inner end of which is disposed adjacent an arm 188 connected to the finger 164 and cam follower 166. It will be seen, from inspection of Figs. 3 and 4, that on pushing button 184 inwardly, the detent 156 is raised, thus freeing the arm 150 for movement to shut-off position.

The main valve V and the hydraulic mechanism for operating the same may be described with reference to Fig. 1 of the drawings. The movable part 190 of the valve, which may, for convenience, be called the valve, is secured to a valve rod 192 connected to a flexible diaphragm 194 clamped between the flanges 196. Diaphragm 194 is reinforced by stiffening plate 198. The valve is normally urged downwardly to closed position by a compression spring 200. Rod 202 bearing against the stiffening plate and acting as a continuation of the valve rod is formed integrally with a piston type valve 204, said valve being vertically slidable in cap 206. Piston 204 is centrally bored at 208 and is provided with a relatively tiny radial bleed opening 210, and a substantially larger bleed opening 212 located thereabove. Fluid under pressure is supplied above the diaphragm by means of a pressure pipe 214. Liquid leaving the space above the diaphragm is discharged through a bleed or relief pipe 216.

It will be apparent that if liquid is supplied through pipe 214, and is prevented from discharging through pipe 216, pressure will be built up above the diaphragm, thus closing the main valve. If, however, pressure line 214 is blocked, and relief line 216 is opened, the fluid above the diaphragm is discharged, thus permitting the pressure beneath the diaphragm to open the valve. If the pressure line 214 is partially blocked, and the relief line 216 is opened, the liquid may escape at a rate such as to establish a differential pressure which causes the valve to partially close. The rate of bleeding of liquid is limited by the small relief opening 210 which causes a pressure to build up and thus causes partial closing of the valve. The valve is not completely closed because when it reaches the desired partially closed position, the large bleed opening 212 is exposed and the pressure cannot be further built up. The position assumed by the valve is, therefore, determined by the lip 218 on piston valve 204, and adjustment may be made on the threaded valve stem with its lock nuts.

Figure 10:
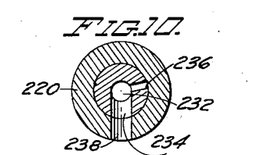
Fig. 10 is a transverse section through the rear or pressure controlling part of the control valve of Fig. 9, with the rotor in position to cause closing of the main valve.

The conditions for the pressure line 214 and relief line 216 are controlled by the control valve C previously referred to. Turning now to Figs. 9 through 15 of the drawings, the rotor 136 is oscillatable within a cylinder 220 which is secured to the casing of the trip mechanism by means of a bolt 222 (Fig. 3). The rotor is inserted in the cylinder from the rear, after which the open end of the valve chamber is closed by a cap 224. Rotor 136 comprises a forward valve 226 for controlling the bleed line 216, and a rear valve 228 for controlling the pressure line 214. Fig. 10 is a section through the pressure valve, the fluid under pressure being admitted to the valve chamber through threaded inlet 230 in head 224. The rear portion of the valve rotor is centrally bored at 232, and large and small discharge ports 234 and 236 extend radially into communication with the center bore 232. The cylinder 220 is provided with a downwardly directed discharge port 238. With the rotor in the position shown in Fig. 10, the ports 234 and 238 are aligned, and the fluid under pressure is supplied to the pressure line 214, the latter being connected to the port 238.

Figure 11:
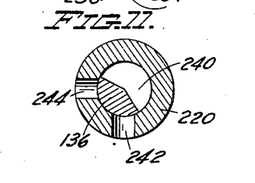
Fig. 11 is a transverse section through the forward or bleed controlling part of the control valve, with the rotor in the same position.

The forword portion of valve rotor 136 is cut away, as is indicated at 240 in Fig. 11. The cylinder 220 is provided with inlet and outlet ports 242 and 244, the inlet port 242 being connected to the relief line 216. The outlet port 244 is connected to a pipe 246 (Fig. 1) which is shown as extending back to the discharge side of valve V. The pressure fluid is taken from the inlet side of valve V through a pipe 248 connected to the inlet 230 (Fig. 9) at the rear end of the cylinder. The pressure fluid used to operate the valve flows through the meter and is measured by the meter, and is later delivered to the discharge side of valve V through pipe 246. It will be understood that it is also possible to keep this pressure circuit outside the meter, as described in the Nyyssonen application previously referred to, that is, pressure fluid may be supplied from a point ahead of the meter so that it is not measured, and may then be bled or returned to the tank.

Reverting now to Fig. 11, it will be seen that the rotor 136 is so disposed as to block the ports 242 and 244, thus effectually preventing discharge of liquid from the diaphragm chamber of the main valve. The pressure supply line 214 being open, and the bleed line 216 being closed, the main valve is closed.

Figure 12:
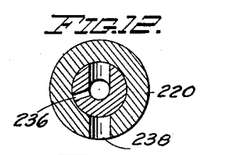
Fig. 12 is a transverse section through the rear or pressure controlling part of the control valve (taken in the plane of the line 12—12 of Fig. 9), with the rotor in position to cause opening of the main valve.
Figure 13:
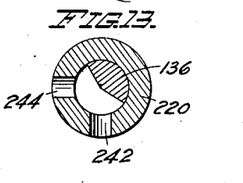
Fig. 13 is a section through the forward or bleed portion of the valve taken in the plane of the line 13—13 of Fig. 9, with the rotor in the same position.

In Figs. 12 and 13, the valve rotor has been turned clockwise, as is done by the handle H when starting the apparatus. At this time, the discharge port 238 is blocked, thus preventing supply of pressure fluid to the diaphragm chamber. The bleed ports 242 and 244 are in free communication with one another, thus relieving the pressure in the diaphragm chamber. The main valve is, therefore, moved to its open position.

Figure 14:
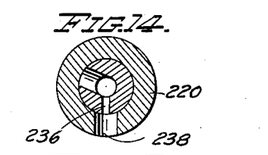
Fig. 14 is a transverse section through the rear of pressure controlling portion of the control valve, with the rotor in position to cause partial closing of the main valve.
Figure 15:
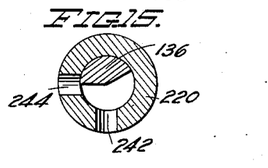
Fig. 15 is a transverse section through the forward or bleed controlling portion with the rotor in the same position.

In Figs. 14 and 15, the rotor has been oscillated in a counterclockwise direction partway back from the open position to the closed position, just as is done when the automatic trip mechanism releases the first tooth of the control arm 150, whereupon the detent engages the second tooth. At this time, the pressure line is supplied with fluid at a decreased rate because the flow to port 238 takes place through constricted opening 236. The relief passages 242 and 244 are in communication, the latter preferably being partially blocked, as shown, but this is not essential because the rate of bleed is more directly determined by the bleed openings in the piston 204 of valve V, as was previously described. The rotor position of Figs. 14 and 15, corresponds, of course, to partial closing of the main valve.

Figure 16:
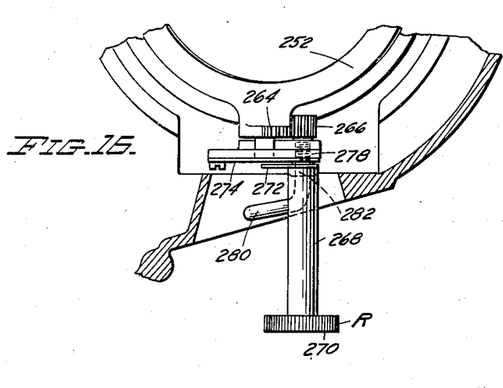
Fig. 16 is a horizontal fragmentary view showing the manually adjustable elements for the accuracy regulator.
Figure 17:
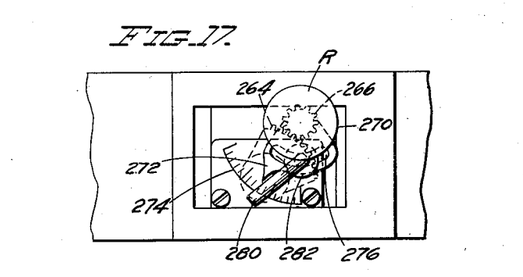
Fig. 17 is a side elevation of the same and is taken in the plane of the line 17—17 of Fig. 3.

The apparatus so far described is further refined by the use of a manually adjustable accuracy regulator which is interposed between the meter and the trip mechanism. This accuracy regulator is preferably of the type disclosed in Bergman Patent No. 2,079,197 previously referred to. Referring to Fig. 3, this regulator is located in the circular part 250 of the casing, near the bottom thereof. It comprises a tiltable ring 252 mounted on trunnions 254 and operating to oscillate an arm 256 connected to a pawl for intermittently moving a ratchet wheel 258 connected to worm 260 meshing with a worm gear 262. The mechanism is substantially like that previously described in connection with the temperature compensating mechanism, but in the present case, the ring 252 remains fixed in adjustment. Thus, referring to Figs. 16 and 17, the ring 252 carries a gear sector 264 meshing with a pinion 266 mounted at the inner end of a shaft 268 carrying a knurled knob 270. Shaft 268 also carries a pointer 272 cooperating with a scale 274. Pointer 272 is enlarged to provide a locking slot 276 through which passes a locking screw 278 (Fig. 16), the outer end of which is bent to form a handle 280. When handle 280 is turned, the collar 282 thereon clamps the pointer 272 against scale plate 274 and locks the ring in adjusted position.

It is not essential to employ a two stage shut-off for the main valve. In fact, in some cases, as for example, in filling barrels with heavy lubricating oils at refineries, the two stage shut-off may be objectionable, because of the increased time needed to fill the barrels. With the two stage shut-off considerable time is consumed for the very slow flow preceding shut-off. If the barrels are to be filled very rapidly, say, one a minute, it may be preferred to use a single stage shut-off. In order to maintain the desired accuracy, the shut-off is made extremely rapid, so that no appreciable error results. Such an arrangement is illustrated in Figs. 21-27 of the drawings to which reference is now made.

Figure 21:
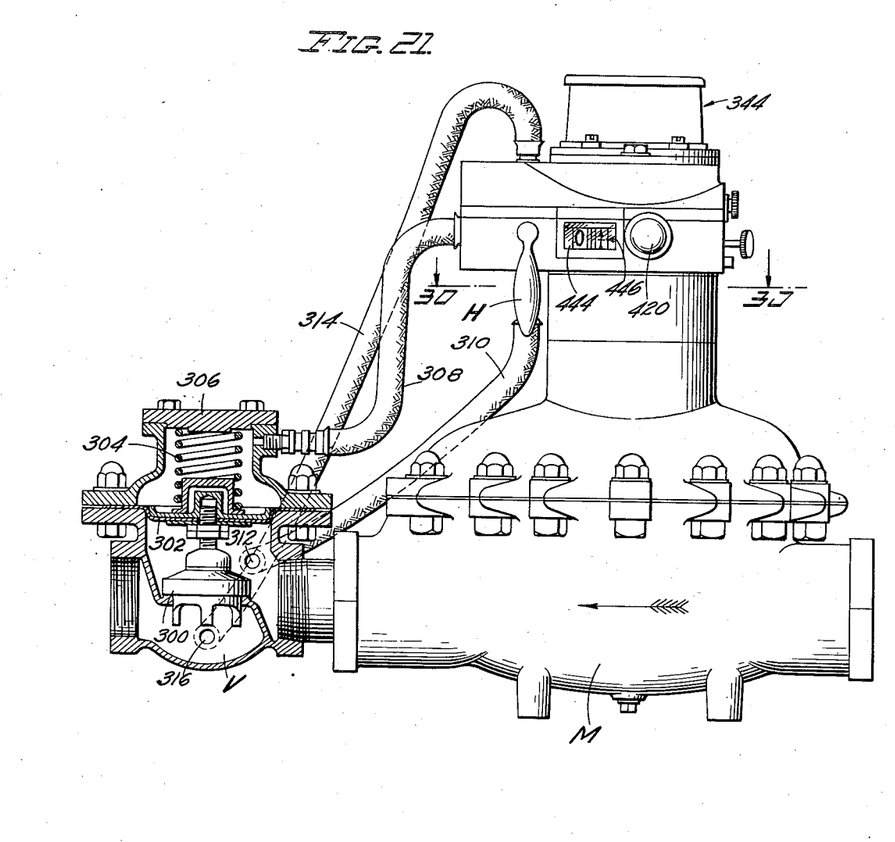
Fig. 21 is a partially sectioned side elevation of a modification of the apparatus, arranged for single stage shut-off, and for manual resetting of the trip mechanism if prematurely tripped.

In Fig. 21, meter M is followed by hydraulic valve V. The movable part 300 of the valve is controlled by diaphragm 302 loaded by means of compression spring 304. The top of the diaphragm chamber is a simple plate 306, there being no piston valve and no structural parts which might dampen the desired quick action of the valve. Only a single pipe 308 leads to the diaphragm chamber, and when this pipe is vented, the valve is held open by the pressure of the liquid beneath diaphragm 302, but when pipe 308 is connected to the liquid under pressure, the valve is quickly closed by spring 304. Pipe 310, connected to the inlet side of the valve at 312, acts as a pressure line leading to the pilot valve, and pipe 314, connected to the discharge side of the valve at 316, acts as a vent or relief pipe. All of these connections are preferably made by one-quarter inch piping, in order to help obtain the desired rapid valve action. (With the two stage shut-off one-eighth inch piping is adequate.)

Inasmuch as the diaphragm chamber is to be connected to either a pressure line or a vent line, the control valve or pilot valve C (Fig. 24) may, in this case, be a simple T valve. Such a valve is shown in Figs. 24 through 27, and referring to these figures, it will be seen that pipe 308 is connected to the control valve at 318; that pressure pipe 310 is connected to the valve at 320, and that the vent pipe 314 is connected to the control valve at 322. The rotor 324 is provided with an L shaped passage 326. With the rotor in the position shown in Figs. 25 and 26, the diaphragm chamber is connected to the relief pipe 314, and the main valve V is open. With the control valve turned counter-clockwise through 90° to the position shown in Fig. 27, the diaphragm chamber is connected to the pressure pipe, and the main valve V is closed.

Figure 22:
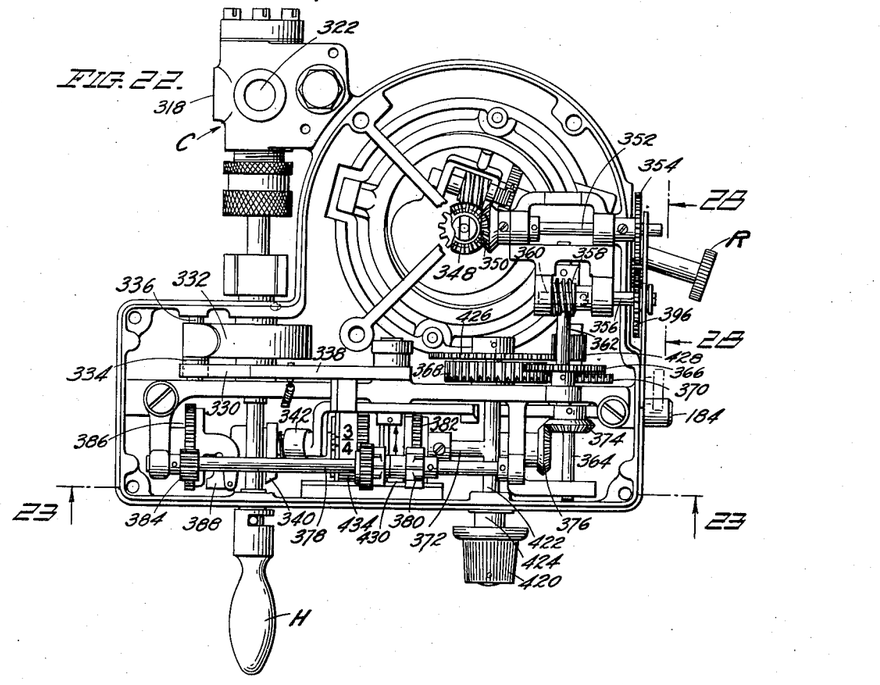
Fig. 22 is a view similar to Fig. 3, but showing the modified apparatus.
Figure 23:
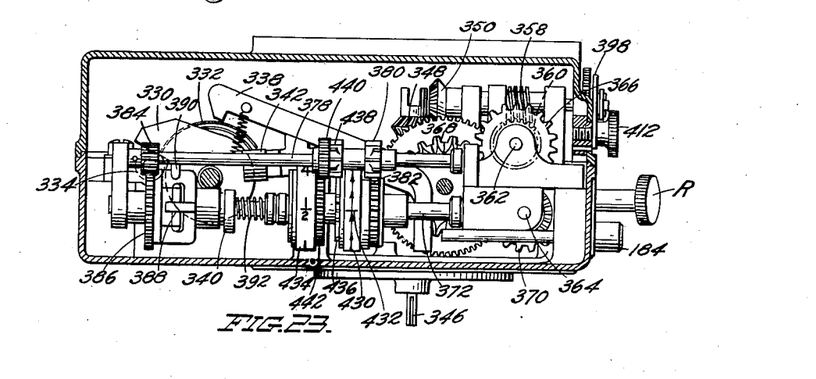
Fig. 23 is a section taken in elevation in the plane of the line 23—23 of Fig. 22.

The necessary movement of the control valve is obtained by mechanism best shown in Figs. 22 and 23, and much like that previously described, except that the notched arm or disc 330 is provided with only a single notch. It is normally urged counter-clockwise by spring 332 and its movement is limited by suitable pin or stop 334, which, in this case, is mounted on the pin 336 which holds the outer end of spring 332. The starting handle H is similar to that previously described but it need be swung through only a 90° arc at which time the arm 330 is engaged by the hook 338. As before, the hook is lifted to trip the valve by a cam 340 when the latter is moved axially to a position beneath the cam follower 342. The tripping point is so selected as to obtain the desired shut-off. In practice, the release of hook 338 takes place approximately one-eighth of a gallon ahead, and we find that accurate shut-off is obtained despite variations in the temperature of the oil and type of oil. The barrels are filled very rapidly at a rate of about one a minute.

Figure 24:
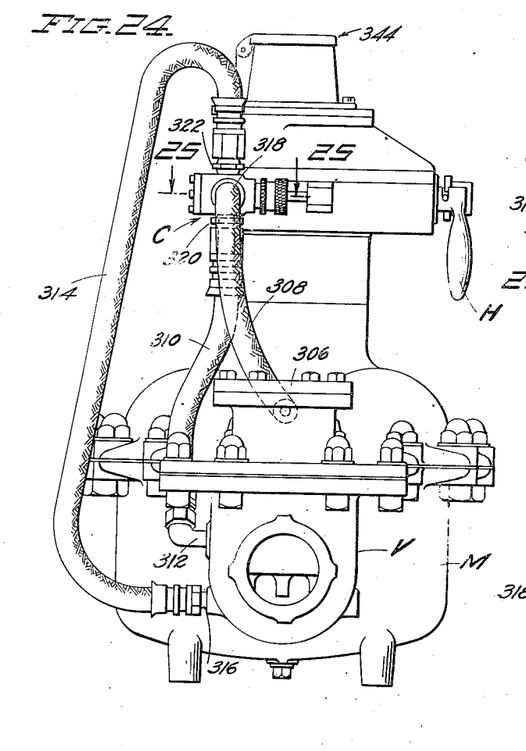
Fig. 24 is an end elevation of the modified apparatus.
Figure 25:
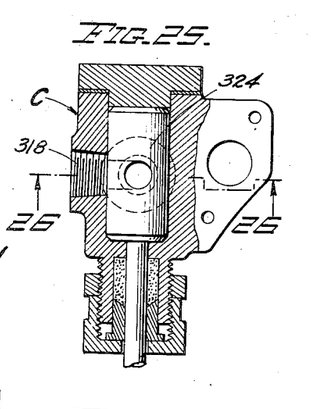
Fig. 25 is a horizontal section through the pilot valve taken approximately on the line 25—25 of Fig. 24.
Figure 26:
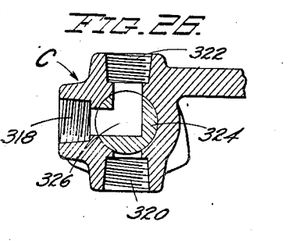
Fig. 26 is a transverse section through the pilot valve taken on the line 26—26 of Fig. 25.
Figure 27:
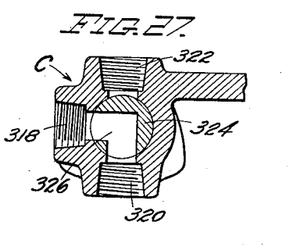
Fig. 27 is a similar section, but with the pilot valve in its valve closing position.

The modified form of the invention now being described differs from that previously described in the gearing of the trip mechanism. In the present arrangement, the changeable gearing is simplified to provide any desired number of gallons over a wider range, and to insure perfect accuracy throughout the range. Moreover, the number of teeth on a removable and replaceable gear may be made to correspond to the number of gallons, thereby eliminating the need for a complex computation. It is also possible to use a totalizer 344 (Figs. 21 and 24).

Referring to Figs. 22 and 23, the drive from the meter is applied to shaft 346 (Fig. 23). This is connected through mitre gears 348, 350 to a sidewardly extending shaft 352, the latter carrying at its outer end a fixed or non-removable gear 354. This drives a worm shaft 356 through appropriate changeable gears. Worm 358 mounted on shaft 356 meshes with a subjacent worm gear 360 mounted on forwardly extending shaft 362. This, in turn, drives shaft 364, but the drive is made indirect in order to accommodate the manual reset mechanism which is subsequently described. Specifically, shaft 362 carries a gear 366 which meshes with an idle gear 368, which in turn meshes with a gear 370 carried on shaft 364.

Shaft 364 is geared to cam shaft 372 by means of mitre gears 374, 376. As before, a transfer shaft is provided, this being numbered 378. Transfer shaft 378 carries a transfer pinion 380 which cooperates (as in Fig. 5) with a mutilated gear 382 carried on cam shaft 372. In this way the transfer shaft 378 is given intermittent motion. The transfer shaft also carries a pinion 384 meshing with a gear 386 freely rotatable on the cam shaft. Gear 386 carries the cam shifter 388 while transfer shaft 378 carries a pin 390.

As before, when pin 390 and the cam shifter 388 come into coincidence, the cam 340 is moved axially against spring 392 into a position cooperative with cam follower 342. This is preparatory to tripping of the valve, and as cam 340 is rotated by the cam shaft it disengages the hook 338 at the exact desired time.

Figure 28:
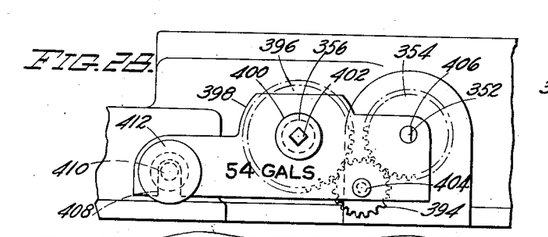
Fig. 28 is a side elevation of the changeable gear mechanism looking in the direction of the arrows 28—28 on Fig. 22.
Figure 29:
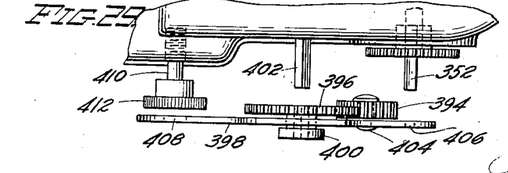
Fig. 29 shows the same in plan with the removable gear plate separated from the shafts and fixed gear.
Figure 30:
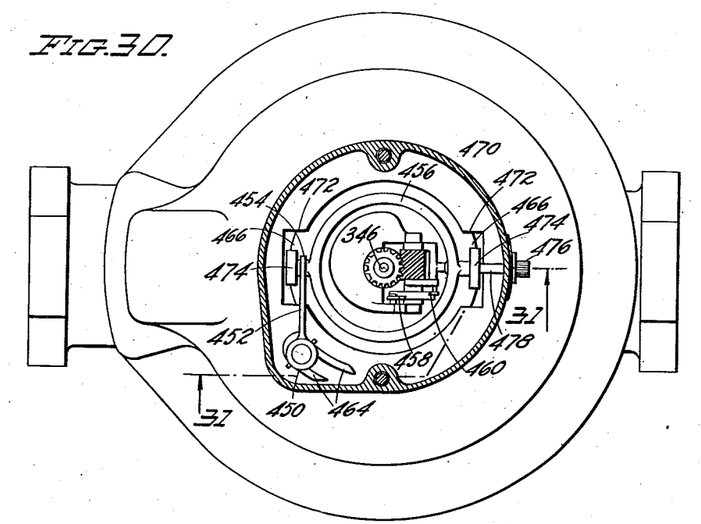
Fig. 30 is a horizontal section taken approximately on the line 30—30 of Fig. 21, and showing the temperature compensating mechanism.
Figure 31:
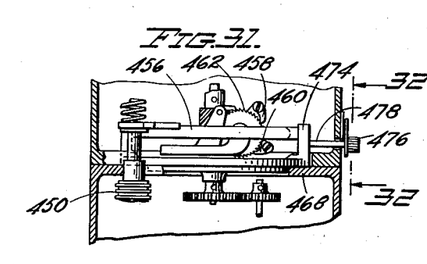
Fig. 31 is a section taken in elevation approximately on the line 31—31 of Fig. 30.

The changeable gears are best shown in Figs. 28 and 29. Gear 354 is a fixed gear permanently secured to shaft 352. The changeable gears are an idler 394 and a driven gear 396, these being carried on a readily removable gear plate 398. Gear 396 is secured to a hub 400 having a square hole, and the outer or projecting end 402 of shaft 356 is squared to receive the gear. The idler or pinion 394 is freely rotatable on a stud 404 which is riveted to plate 398. Plate 398 is provided with a hole 406 which fits freely over shaft 352. It is also provided with a slot 408 which fits over the shank 410 of a thumb screw 412. The plate 398 together with idler 394 and driven gear 396 is readily removed by loosening or removing the thumb screw, and thereupon moving the plate outwardly off the shafts. Another plate with different gears may be applied, all of the plates being interchangeable.

In each case the driven gear is so located relative to the hole 406 as to fit properly over the square end 402 of shaft 356. The idler 394 is so selected as to mesh with the gears 354 and 396.

The direction of rotation of the shafts is such as to allow for the interposition of the idler 394. The advantage of using an idler is that no difficulty arises as a result of the fixed center to center distance between the shafts 352 and 356. In other words, the gear 396 may be varied greatly in diameter, the difference being taken up by the use of any appropriate size of idler properly located on the gear plate 398. With only two gears in direct mesh, as in Fig. 4 of the drawings, it sometimes is difficult to simultaneously satisfy the requirement for proper gear ratio and proper center to center spacing while using a whole number of teeth. Slight departures from accuracy may be compensated by adjustment of the "microset" or ratio adjustment controlled by the knob R. This, however, may require trial and error weighing of filled barrels, and also makes it impracticable to use a totalizer, for the reading of the totalizer will become cumulatively wrong if the adjustment at R is varied for this purpose, instead of being used merely to correct possible inaccuracy in the response of the meter itself.

The removable gear arrangement of Figs. 28 and 29 makes it readily possible to establish exactly the desired gear ratio. Furthermore, the arrangement may be so designed that the number of teeth on the driven gear 396 corresponds numerically to the trip quantity or number of gallons to be supplied. Thus, in the present case, the gear 396 has 50 teeth for a 50 gallon barrel, 51 teeth for a 51 gallon barrel, etc. Ordinarily, the apparatus is supplied with six gear plates covering a range of from 50 to 55 gallons. However, a much wider range is available, and to fill special requirements the gear 396 may, for example, have only 14 teeth, corresponding to the filling of small 14 gallon barrels.

The manner in which this result is obtained in the specific mechanism here disclosed, is as follows:

Referring to Figs. 22 and 23, the meter shaft 346 turns one rotation for one gallon of flow (there is, of course, a reduction gear train between the meter piston and shaft 346, this being the so-called "intermediate" located near the top of the meter body). Shaft 352 also turns one revolution for one gallon. Fixed gear 354 has 40 teeth. Assume driven gear 396 also has 40 teeth, in which case shaft 356 and worm 358 turn one revolution for one gallon. The worm ratio is 10 to 1, and in the specific construction herein shown, the worm is a double worm, while the worm gear 360 has 20 teeth. The gears 366 and 370 are equal. Hence, shaft 364 turns once for 10 gallons, and similarly the cam shaft 372 turns once for 10 gallons. The mutilated or transfer gear 382 has 10 teeth, while transfer pinion 380 has 8 teeth, thus producing one and one-quarter revolutions of the transfer shaft for one revolution of the cam shaft. Pinion 384 has 8 teeth and gear 386 has 20 teeth, thus producing a reduction ratio of 2½ to 1. The total reduction is, therefore, only 1 to 2. The reason a simple reduction of 1 to 2 is not used between pinion 384 and gear 386 is in order to avoid premature tripping or contact between pin 390 and cam shifter 388. For these parts to engage requires two revolutions of the cam shifter, corresponding to five revolutions of the transfer shaft. This, in turn, requires four revolutions of the cam shaft, and inasmuch as each revolution corresponds to a flow of 10 gallons, the arrangement will trip after a flow of 40 gallons.

For this result the driven gear 396 on gear plate 398 was provided with 40 teeth. If the driven gear 396 is given an increased number of teeth then the tripping point is reached later, or after a greater flow. Thus, with 50 teeth the apparatus will trip at 50 gallons, with 51 teeth the apparatus will trip at 51 gallons, etc. Or, going in the other direction with 15 teeth the apparatus will trip at 15 gallons.

In some cases, the purchaser of the apparatus may require reset mechanism to manually restore the apparatus to zero whenever desired. This is of value, for example, when changing from one kind of oil to another, for in such case the meter and hose, etc., will be filled with the old oil. This may be discharged into a waste barrel or the like until the new oil comes through. For this purpose the discharge may be a matter of only 10 or 15 gallons. Without the reset mechanism the discharge of oil must be continued until an amount equal to a full barrel has been discharged, in order to bring the apparatus to zero preparatory to the filling of barrels with the new oil. By providing reset mechanism the extra waste is avoided.

Referring now to Figs. 22 and 23, knob 420 acts as a reset knob and is mounted on a shaft 422 which is both rotatable and axially reciprocable. The shaft is normally urged forwardly by a spring which may be housed at 424. Shaft 422 carries a large gear 426 which meshes with a pinion 428 carried on shaft 364. The idler gear 368 is freely rotatable on shaft 422, but is axially movable therewith. Knob 420 cannot be rotated unless first pushed inwardly. If pushed inwardly the idler 368 is disengaged from gear 370, and thereby frees the trip mechanism from the meter and from the totalizer, if a totalizer is used. Rotation of knob 420 spins the shaft 364 and consequently the trip mechanism. In this way, the trip mechanism may be turned to zero without any accompanying change of the meter and totalizer reading.

In order to determine the zero position, the cam shaft 372 is provided with an indicator wheel 430, said wheel having a series of arrows and a cross line 432 corresponding to zero. However, the indicator wheel 430 is not alone enough, because the cam shaft turns through four revolutions for the filling of one barrel. Another indicator wheel 434, is, therefore, provided and this wheel is freely rotatable on the cam shaft, but is so geared to the transfer shaft as to turn only one revolution for four revolutions of the cam shaft. The wheel 434 is marked in fractions of a barrel, rather than in gallons, for the number of gallons differs in accordance with the size of the gear on the changeable gear plate.

The transfer mechanism for indicator wheel 434 includes a notched disc or mutilated gear 436 on wheel 430, this having 4 teeth. The transfer pinion 438 has 8 teeth, and is, therefore, moved a half revolution. Transfer pinion 438 is secured to a pinion 440 which meshes in 2 to 1 ratio with a gear 442 secured to fraction wheel 434. In the specific case here shown the pinion 440 has 24 teeth and the gear 442 has 48 teeth. The total transfer reduction is, therefore, 4 to 1, the indicator wheel 430 turning four times for one complete revolution of the fraction wheel 434, which is as it should be. The two indicator wheels are exposed through a window 444, as is best shown in Fig. 21. The knob is simply rotated until the fraction wheel reads zero, and the cross line on the other wheel lines up with a suitable pointer 446 at window 444.

In describing the first form of the invention, reference was made to the means for automatic temperature adjustment and to the importance of this temperature adjustment, in order that the delivered quantity may be correct at a fixed standard temperature, say, 60° F. The present form of the invention is provided with similar temperature compensating means, but in the present case there is additionally provided a means for regulating the amount of temperature compensation. Referring to Figs. 30-33 the temperature compensating mechanism is like that previously described in comprising an expansion bellows 450 (Fig. 31) operating on an arm 452 (Fig. 30) connected at 454 to a tiltable ring 456 forming a part of ratio adjusting mechanism of the type previously described. A detail which may be mentioned is the use of two feed pawls 458 and 460 on the arm which is rocked by ring 456, for by staggering the pawls an amount equal to a half tooth of the ratchet wheel 462, an effect is obtained equivalent to the use of a ratchet wheel having twice as many teeth.

Figure 32:
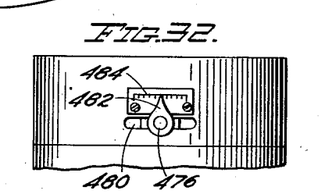
Fig. 32 is a side elevation looking in the direction of the arrows 32—32 of Fig. 31.
Figure 33:
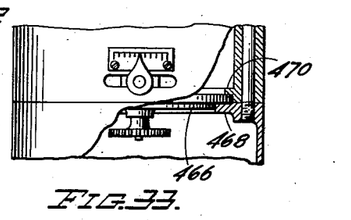
Fig. 33 is a view similar to Fig. 32, but partially sectioned to explain the mounting of the temperature adjusting mechanism.

To provide for adjustment of the amount of temperature compensation, the effective length of the arm 452 is made variable. For this purpose, the movable end of the arm is forked as indicated at 464 and the forked end is curved about the vertical or meter shaft 346 as the center. The entire ratio adjustment unit is mounted on a circular plate 466, and this plate is received above flange 468 and below flange 470 (Fig. 33). Flange 470 is cut away at 472 (Fig. 30) to provide clearance at each side of the upright post or bearings 474 of the ratio adjusting unit. This provides room for oscillation of the complete unit, and it will be evident from inspection of Fig. 30 that inasmuch as the bellows 450 is stationary, the oscillation of the unit may be used to length or shorten the effective length of arm 452. The adjustment may be made from the outside by means of a knob 476 carried at the outer end of a rod 478 projecting from the unit through a slot 480. The knob 476 is preferably provided with a pointer 482 cooperating with the stationary scale 484 as is best shown in Fig. 32.

The resulting adjustment of the amount of temperature compensation is desirable, because of non-uniformity in the manufacture of the bellows, and also because different liquids may have different expansions or temperature coefficients.

It is believed that the construction and operation of our improved repeating valve shut-off system, as well as the many advantages thereof, will be apparent from the foregoing detailed description thereof. The main valve V is normally closed, regardless of whether the pump is operated, because the valve is closed both gravitationally and by the spring.

To fill barrels, it is merely necessary to start the pump, to insert the nozzle of the discharge pipe in the first barrel, and to then swing the starting handle H. This moves the pilot valve to the starting position, and the main valve is promptly opened by the relief of pressure above the diaphragm. The meter turns the cam shaft and this intermittently turns the pinion or transfer shaft. When the delivery is nearly completed, the cooperative trip elements come into contact, as shown in Fig. 8, thus shifting the cam beneath the cam follower. The cam then moves detent or hook upwardly, releasing the arm and permitting spiral spring to shift the control valve rotor from the starting position. With two stage shut-off the main valve is partially closed and later the detent again releases the rotor with consequent complete closing of the main valve. With single stage shut-off the main valve is completely closed immediately.

To fill another barrel the nozzle is simply inserted in the next barrel and the starting handle again moved. When the second barrel is filled, the nozzle is transferred to a third barrel, etc. For each barrel it is merely necessary to move the starting handle, and all of the barrels are filled with the same amount of liquid. Should some emergency make it desirable to prematurely trip the main valve, it is merely necessary to push the button 184. The amount delivered to the barrels is corrected for desired standard temperature by the automatic temperature compensating mechanism.

If the barrel size is changed, it is merely necessary to change the replaceable gears, as was previously described. Occasionally, a filled barrel may be weighed to check the accuracy of the apparatus. If an error is found, due to the response of the meter itself, such error may be corrected by the ratio adjusting mechanism under control of the knob R. If the error is caused by incorrect temperature compensation, this factor may be varied by the mechanism shown in Figs. 30-33.

It is believed that the construction and operation, as well as the many advantages of our improved repeating valve shut-off system, will be apparent from the foregoing detailed description. It will also be apparent that while we have shown and described our invention to preferred forms, many changes and modifications may be made in the structures disclosed without departing from the spirit of the invention defined in the following claims.

We claim:

1. A repeating trip mechanism for measuring purposes, said mechanism comprising a gear train including meshing spur gears, a radially projecting trip element rotatable with one of said meshing spur gears, a radially projecting trip element rotatable with the other of said meshing spur gears, and cooperative trip elements on two different parts of said gear train, the gear relationship or ratio in said gear train being such that said trip elements bear radially against one another when the measurement reaches a predetermined desired trip quantity and each multiple thereof, but said trip elements escape one another at any different quantity.

2. A repeating valve shut-off system comprising a meter, a gear train driven thereby, cooperative trip elements on two different parts of said gear train, the gear relationship in said gear train being such that said trip elements bear against one another when the meter reaches a predetermined desired trip quantity and each multiple thereof, but said trip elements escape one another at any different quantity, and temperature responsive means to compensate for variations in temperature of the fluid passing through the meter.

3. A repeating trip mechanism for measuring purposes, said mechanism comprising a gear train having a plurality of gears arranged in series, the earlier gear acting as an input or driving section, and the later gear acting as a trip section, cooperative trip elements on two different rotating parts of the trip section of said gear train, the gear relationship in said gear train being such that said trip elements bear against one another when the measurement reaches a predetermined desired trip quantity and multiples thereof, but said trip elements escape one another at any different quantity, and readily replaceable gears in the driving section of said gear train for determining the aforesaid desired trip quantity.

4. A repeating valve shut-off system comprising a meter, a driven gear train, a driving gear train between the meter and the driven gear train, cooperative trip elements on two different parts of said driven gear train, said trip elements bearing against one another when the meter reaches a predetermined trip quantity and multiples thereof, but said trip elements missing one another at any different quantity, readily replaceable gears in said driving gear train for determining the desired trip quantity, and temperature responsive means to compensate for variations in the temperature of the fluid passing through the meter.

5. Repeating shut-off mechanism for use with a valve and a measuring means, said mechanism comprising a cam shaft, a cam rotatable with said shaft, a cam follower for causing tripping of a valve, means normally separating the cam and cam follower, a gear train means whereby a measuring means may be used for driving the gear train and the cam shaft, cooperative trip elements on two different parts of said gear train, the gear relationship in said gear train being such that said trip elements bear against one another and function to shift the cam and cam follower into operative position when the measurement approaches a predetermined desired quantity and multiples thereof, but said elements missing one another at any different quantity, some of the gears in the aforesaid gear train being replaceable to determine the desired trip quantity.

6. Repeating valve shut-off mechanism comprising a valve, a cam shaft arranged to be driven by a meter, a cam rotatable with said shaft, a cam follower for causing tripping of the valve, means normally separating the cam and cam follower, a gear train also arranged to be driven by said meter, cooperative trip elements on two different parts of said gear train, the gear relationship in said gear train being such that said trip elements bear against one another and function to shift the cam and cam follower into operative position when the meter approaches a predetermined desired quantity and multiples thereof, but said elements missing one another at any different quantity, some of the gears in the aforesaid gear train being replaceable to determine the desired trip quantity, and automatic temperature compensating means between the meter and the cam shaft for compensating for changes in the temperature of the fluid passing through the meter.

7. Repeating valve shut-off mechanism comprising a valve, a cam shaft arranged to be driven by a meter, a cam rotatable with said shaft, a cam follower for causing tripping of the valve, means normally separating the cam and cam follower, a gear train also arranged to be driven by said meter, cooperative trip elements on two different parts of said gear train, the gear relationship in said gear train being such that said trip elements bear against one another and function to shift the cam and cam follower into operative position when the meter approaches a predetermined desired quantity and multiples thereof, but said elements missing one another at any different quantity, some of the gears in the aforesaid gear train being changeable to determine the desired trip quantity, and temperature compensating means including a worm and related gearing for locking together two shafts between the meter and the cam shaft, pawl and ratchet mechanism for intermittently rotating the worm a slight amount, an oscillating member connected to the pawl for oscillating the pawl during each revolution of the shafts, adjustment means to vary the amount of oscillation of the oscillatable member, and a liquid filled bulb immersed in the fluid in the meter and connected to an expansion bellows having one end fixed and the other end movable and connected to the adjustment means.

8. Repeating shut-off mechanism for use with a valve and a measuring means, said mechanism comprising a control arm having positions corresponding to open and closed positions of a valve, means urging the arm to the latter position, detent means for holding the arm in the first position, a cam shaft, a cam rotatable with said shaft, a cam follower connected to the aforesaid detent means for releasing the same, means normally separating the cam and cam follower, a gear train whereby a measuring means may be used for driving the gear train and the cam shaft, cooperative trip elements on two different parts of said gear train, the gear relationship in said gear train being such that said trip elements bear against one another and function to shift the cam and cam follower into operative position when the measurement approaches a predetermined desired quantity and multiples thereof, but said elements missing one another at any different quantity, some of the gears in the aforesaid gear train being changeable to determine the desired trip quantity.

9. Repeating valve shut-off mechanism comprising an hydraulically operated main valve, a control valve therefor including a rotor having positions corresponding to open and closed positions of the main valve, means urging the rotor to the latter position, detent means for holding the rotor in the first position, a cam shaft arranged to be driven by a meter, a cam rotatable with said shaft, a cam follower connected to the aforesaid detent means for releasing the same, means normally separating the cam and cam follower, a gear train also arranged to be driven by said meter, cooperative trip elements on two different parts of said gear train, the gear relationship in said gear train being such that said trip elements bear against one another and function to shift the cam and cam follower into operative position when the meter approaches a predetermined desired quantity and multiples thereof, but said elements miss one another at any different quantity, some of the gears in the aforesaid gear train being changeable to determine the desired trip quantity.

10. Repeating valve shut-off mechanism comprising an hydraulically operated main valve, a control valve therefor including a rotor having positions corresponding to open and closed positions of the main valve, means urging the rotor to the latter position, detent means for holding the rotor in the first position, a cam shaft arranged to be driven by a meter, a cam rotatable with said shaft, a cam follower connected to the aforesaid detent means for releasing the same, means normally separating the cam and cam follower, a gear train also arranged to be driven by said meter, cooperative trip elements on two different parts of said gear train, the gear relationship in said gear train being such that said trip elements bear against one another and function to shift the cam and cam follower into operative position when the meter approaches a predetermined desired quantity or multiples thereof, but said elements miss one another at any different quantity, some of the gears in the aforesaid gear train being changeable to determine the desired trip quantity, and automatic temperature compensating means between the meter and the cam shaft for compensating for changes in the temperature of the fluid passing through the meter.

11. Repeating valve shut-off mechanism comprising a meter, a cam shaft, a gear train leading from said meter to said cam shaft, a cam rotatable with and axially slidable on said cam shaft, a cam follower for operatively controlling the valve, a spring normally moving the cam away from the cam follower, a pinion driven from said gear train, a gear meshing with said pinion, a cam shifter rotatable with said gear, means on said pinion cooperating with said cam shifter to shift the cam into operative position when the meter reaches a predetermined trip quantity and successive multiples thereof, the teeth of the gearing being such that the aforesaid means do not come into operative relation at any different quantity, and automatic temperature compensating mechanism between said meter and said cam shaft for compensating for changes in the temperature of the fluid passing through the meter.

12. Repeating shut-off mechanism for use with a valve, said mechanism comprising a cam shaft, a gear train leading to said cam shaft, a cam rotatable with and axially slidable on said cam shaft, a cam follower for operatively controlling a valve, a spring normally moving the cam away from the cam follower, a pinion driven from said gear train, a gear meshing with said pinion, a cam shifter rotatable with said gear, means on said pinion cooperating with said cam shifter to shift the cam into operative position when the gear train reaches a predetermined trip quantity and successive multiples thereof, the teeth of the pinion and gear being such that the aforesaid means do not come into operative relation at any different quantity, and a pair of gears in the aforesaid gear train leading to the cam shaft being replaceable to determine the desired trip quantity.

13. Repeating shut-off mechanism for use with a valve, said mechanism comprising a cam shaft, a gear train leading to said cam shaft, a second shaft, Geneva type gearing between said shafts for only intermittently moving the second shaft, a cam rotatable with and axially slidable on said cam shaft, a cam follower for operatively controlling the valve, a spring normally moving the cam to a position away from the cam follower, a pinion on said second shaft, a gear freely rotatable on the cam shaft, a cam shifter rotatable with said gear, means on said second shaft cooperating with said cam shifter to shift the cam into operative position when the gear train reaches a predetermined trip quantity and successive multiples thereof, the teeth of the gearing being such that the aforesaid means do not come into operative relation at any different quantity, a pair of gears in the aforesaid gear train leading to the cam shaft being replaceable to determine the desired trip quantity.

14. A repeating shut-off mechanism for use with a valve, said mechanism comprising a trip mechanism, a driving gear train leading to the trip mechanism, said trip mechanism functioning to trip a valve when the driven gear train reaches a predetermined trip quantity and multiples thereof, but not at any different quantity, said driving gear train including spaced shafts, a gear fixed on one of said shafts, and a readily removable and replaceable gear plate associated with said shafts and carrying a gear adapted to be received on the other shaft and carrying an idler pinion for driving said gear and so dimensioned and disposed on the plate as to mesh with the fixed gear when the plate-carried gear is in its shaft, the gear ratios in the gear trains being such that the number of teeth on the plate-carried gear corresponds numerically to the desired trip quantity.

15. A repeating shut-off mechanism for use with a valve, said mechanism comprising a driven gear train, a driving gear train leading to the driven gear train, cooperative trip elements on two different parts of said driven gear train, said trip elements bearing against one another when the driven gear train reaches a predetermined trip quantity and multiples thereof, but said trip elements missing one another at any different quantity, said driving gear train including spaced shafts, a gear fixed on one of said shafts, and a readily removable and replaceable gear plate associated with said shafts and carrying a gear adapted to be received on the other shaft and carrying an idler pinion for driving said gear and so dimensioned and disposed on the plate as to mesh with the fixed gear when the plate-carried gear is on its shaft, the gear ratios in the gear trains being such that the number of teeth on the plate-carried gear corresponds numerically to the desired trip quantity.

16. A repeating valve shut-off system comprising a meter, a driven gear train, a driving gear train between the meter and the driven gear train, cooperative trip elements on two different parts of said driven gear train, said trip elements bearing against one another when the meter reaches a predetermined trip quantity and multiples thereof, but said trip elements missing one another at any different quantity, said driving gear train including spaced shafts, a gear fixed on one of said shafts, a readily removable and replaceable gear plate associated with said shafts and carrying a gear adapted to be received on the other shaft and carrying an idler pinion for driving said gear and so dimensioned and disposed on the plate as to mesh with the fixed gear when the plate-carried gear is on its shaft, the gear ratios in the gear trains being such that the number of teeth on the plate-carried gear corresponds numerically to the desired trip quantity, and temperature responsive means to compensate for variations in the temperature of the fluid passing through the meter.

17. A repeating trip mechanism, said mechanism comprising a driven gear train, a driving gear train leading to the driven gear train, cooperative trip elements on two different parts of said driven gear train, said trip elements bearing against one another when the driven gear train reaches a predetermined trip quantity and multiples thereof, but said trip elements missing one another at any different quantity, readily removable and replaceable gears for determining the desired trip quantity, re-set means including means to disengage a part of the driving gear train in order not to affect any means ahead of the gear train during re-setting of the trip mechanism to zero, and indicator wheels associated with said driven gear train for indicating when the trip mechanism has been re-set to zero.

18. A repeating trip mechanism, said mechanism comprising a driven gear train, a driving gear train leading to the driven gear train, cooperative trip elements on two different parts of said driven gear train, said trip elements bearing against one another when the driven gear train reaches a predetermined trip quantity and multiples thereof, but said trip elements missing one another at any different quantity, said driving gear train including spaced shafts, a gear fixed on one of said shafts, a readily removable and replaceable gear plate associated with said shafts and carrying a gear adapted to be received in the other shaft and carrying an idler pinion meshing with said gear and so dimensioned and disposed on the plate as to drive the fixed gear when the plate-carried gear is on its shaft, the gear ratios in the gear trains being such that the number of teeth on the plate-carried gear corresponds numerically to the desired trip quantity, re-set means including means to disengage a part of the driving gear train in order not to affect any means ahead of the gear train during re-setting of the trip mechanism to zero, and indicator wheels associated with said driven gear train for indicating when the trip mechanism has been re-set to zero.

19. A repeating valve shut-off system comprising a meter, a gear train, cooperative trip elements bearing against one another when the meter reaches a predetermined trip quantity and multiples thereof, readily replaceable gears in said gear train for determining the desired trip quantity, temperature responsive means to compensate for variations in the temperature of the fluid passing through the meter, and manually adjustable means for adjusting the amount of temperature compensation produced by the temperature responsive means.

20. A repeating valve shut-off system comprising a meter, a driven gear train, a driving gear train between the meter and the driven gear train, cooperative trip elements on two different parts of said driven gear train, said trip elements bearing against one another when the meter reaches a predetermined trip quantity and multiples thereof, but said trip elements missing one another at any different quantity, readily replaceable gears in said driving gear train for determining the desired trip quantity, temperature responsive means to compensate for variations in the temperature of the fluid passing through the meter, and manually adjustable means including a scale and pointer for adjusting the amount of temperature compensation produced by the temperature responsive means.

21. A repeating valve shut-off system comprising a meter, a gear train driven thereby, cooperative trip elements on two different parts of said gear train, the gear relationship in said gear train being such that said trip elements bear against one another when the meter reaches a predetermined desired trip quantity and successive multiples thereof, but said trip elements escape one another at any different quantity, and temperature compensating means including a bodily rotatable worm and related gearing for locking two shafts together between the meter and the aforesaid gear train, pawl and ratchet mechanism for intermittently rotating the worm a slight amount, an oscillating member connected to the pawl for oscillating the pawl during each revolution of the shafts, adjustment means to vary the amount of oscillation of the oscillatable member, and a liquid-filled bulb immersed in the fluid in the meter and connected to an expansion bellows having one end fixed and the other end movable and connected to the adjustment means.

MEAD CORNELL.
ALEXANDER R. WHITTAKER.